United States Patent [19]

Krall, Jr. et al.

[11] Patent Number: 5,726,912
[45] Date of Patent: Mar. 10, 1998

[54] CONTROL SYSTEM MONITOR

[75] Inventors: Rudy A. Krall, Jr., Glendale; Matthew A. Taylor, Phoenix; Shaun D. Burch, Chandler; Adam J. Puleo, Phoenix, all of Ariz.

[73] Assignee: Honeywell IAC, Phoenix, Ariz.

[21] Appl. No.: 709,545

[22] Filed: Sep. 6, 1996

[51] Int. Cl.$^6$ .................................................... G08B 23/00
[52] U.S. Cl. .......................... 364/550; 364/130; 364/143; 340/500; 340/501; 340/506
[58] Field of Search ...................... 364/550, 131, 364/132, 138, 185, 188, 189, 514 C, 182.02, 284.4, 143; 379/102, 106, 96; 340/500, 501, 506

[56] References Cited

U.S. PATENT DOCUMENTS

| | | | |
|---|---|---|---|
| 4,751,648 | 6/1988 | Sears, III et al. | 364/422 |
| 4,827,423 | 5/1989 | Beasley et al. | 364/468 |
| 4,887,075 | 12/1989 | Hirasawa | 364/240 |
| 5,014,218 | 5/1991 | Crajin et al. | 364/502 |
| 5,191,313 | 3/1993 | Galbraith | 340/501 |
| 5,198,806 | 3/1993 | Lord | 340/825.31 |
| 5,446,680 | 8/1995 | Sekiya et al. | 364/550 |
| 5,483,467 | 1/1996 | Krupka et al. | 364/550 |
| 5,497,479 | 3/1996 | Hornbuckle | 395/491 |
| 5,598,407 | 1/1997 | Bud et al. | 370/330 |

*Primary Examiner*—Emanuel T. Voeltz
*Assistant Examiner*—Hien Vo
*Attorney, Agent, or Firm*—Arthur A. Sapelli; Anthony Miologos

[57] ABSTRACT

A process control system (PCS) includes a control network and a plurality of nodes coupled thereto, the PCS controlling a process. A monitoring system, operatively connected to the PCS, obtains predetermined data of the PCS to monitor the performance of the PCS. The monitoring system comprises a first computer system operatively connected to the control network of the PCS. The first computer system continually accesses the predetermined data of the PCS on a predetermined periodic basis in accordance with a predetermined protocol of the control network. The first computer system is located in physical proximity with the PCS. A second computer system is located remotely from the PCS. The second computer system receives the predetermined data of the PCS transferred from the first computer system, the transfer being initiated by the first computer system when an alarm condition of the PCS is indicated by the predetermined data. A communication line is connected between the first and second computer systems for providing a communication link therebetween.

14 Claims, 9 Drawing Sheets

CONTROL SYSTEM MONITOR

BACKGROUND OF INVENTION

The present invention relates to a control system monitor, and, more particularly, to a non-intrusive monitoring system which collects and analyzes data of a digital control system for maintaining a history of the performance of the digital control system, including identifying alarm conditions of the digital control system.

Current control system performance measurement systems (hardware/software) can put a significant load on the various nodes of the control system. Further, the performance data which is to be collected by the performance measurement system (sometimes referred to as performance monitoring system) cannot be remotely accessed and there is no capability of having predetermined performance alarm(s) sent to a remote location upon detection.

The present invention provides the features which permit the collection, calculation, historization of alarm, and control network performance parameters (data) from the process control system while minimizing the performance impact of the measurement process. The control system monitor of the present invention accesses the historical data of the process control system from a remote location via standard communication lines and receives notification of the remote location whenever a measured performance parameter exceeds a configurable limit.

SUMMARY OF THE INVENTION

Therefore, there is provided by the present invention a method for remote accessing and alarming of control network performance parameters. A process control system (PCS) includes a control network and a plurality of nodes coupled thereto, the PCS controlling a process. A monitoring system, operatively connected to the PCS, obtains predetermined data of the PCS to monitor the performance of the PCS. The monitoring system comprises a first computer system operatively connected to the control network of the PCS. The first computer system continually accesses the predetermined data of the PCS on a predetermined periodic basis in accordance with a predetermined protocol of the control network, the first computer system is located in physical proximity with the PCS. A second computer system is located remotely from the PCS. The second computer system receives the predetermined data of the PCS transferred from the first computer system, the transfer being initiated by the first computer system when an alarm condition of the PCS is indicated by the predetermined data. A communication line is connected between the first and second computer systems for providing a communication link therebetween.

Accordingly, it is an object of the present invention to provide a method for remote accessing of control network performance parameters.

It is another object of the present invention to provide a method for remote alarming and notification when a predetermined performance parameter of a control network system exceeds a predetermined configurable limit.

These and other objects of the present invention will become more apparent when taken in conjunction with the following description and attached drawings, wherein like characters indicate like parts, and which drawings form a part of the present application.

DETAILED DESCRIPTION

Figure 1:
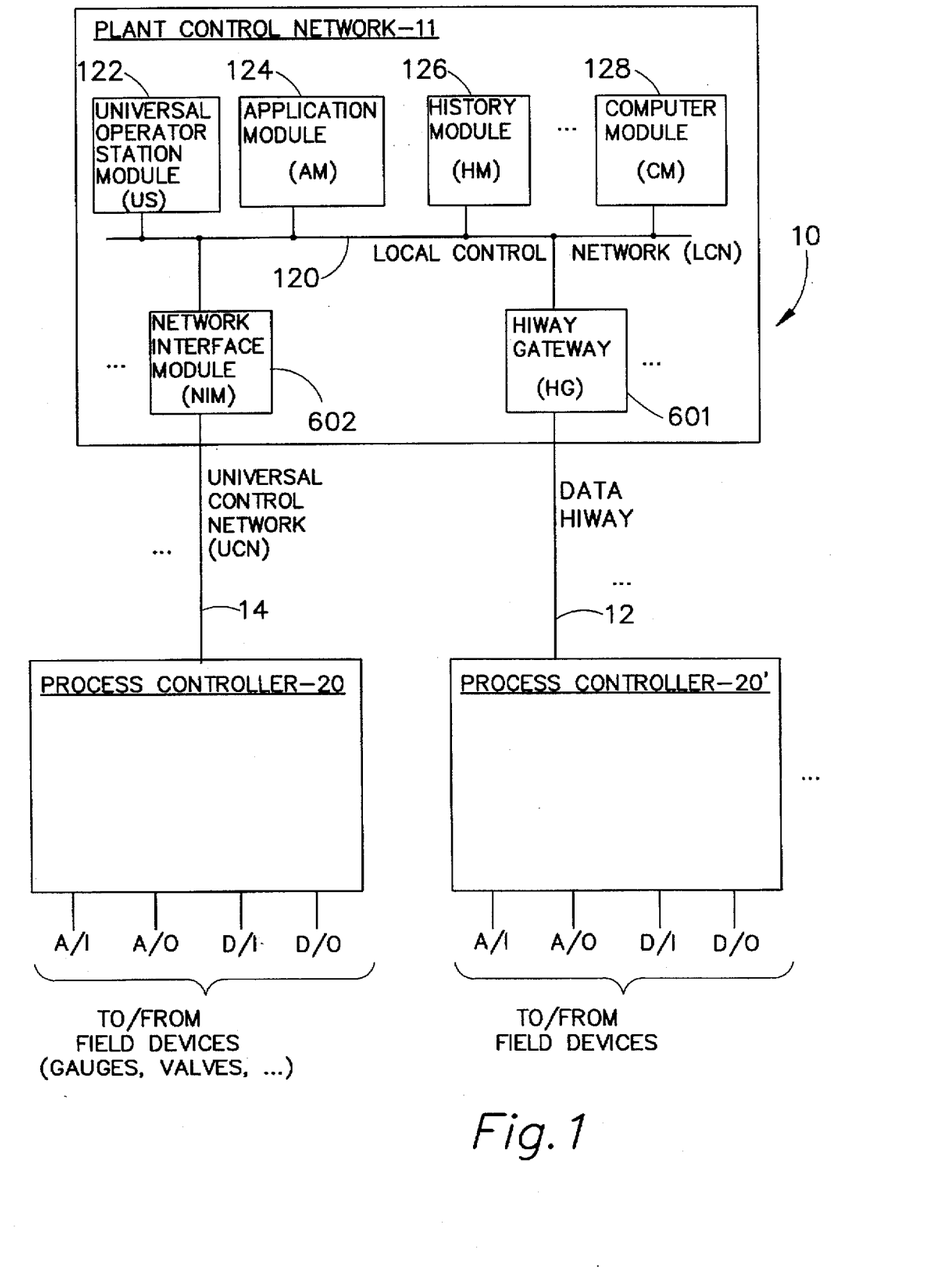
FIG. 1 shows a block diagram of a process control system of the preferred embodiment in which the present invention can be utilized.

Before describing the method of the present invention, it will be helpful in understanding a system environment in which the invention is utilized. Referring to FIG. 1, there is shown a block diagram of a process control system 10 of the preferred embodiment in which the present invention can be found. The process control system 10 includes a plant control network 11, and connected thereto is a data hiway 12, which permits a process controller 20' to be connected thereto. In the present-day process control system 10, additional process controllers 20' can be operatively connected to the plant control network 11 via a corresponding hiway gateway 601 and a corresponding data hiway 12. A process controller 20, an interface apparatus which includes many new additions, improvements, and features over the process controller 20', is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controllers 20, 20' interface the analog input and output signals and digital input and output signals (A/I, A/O, D/I, and D/O respectively) to the process control system 10 from the variety of field devices (not shown) of the process being controlled which include valves, pressure switches, pressure gauges, thermocouples.

The plant control network (or more simply network) 11 provides the overall supervision of the controlled process, in conjunction with the plant operator, and obtains all the information needed to perform the supervisory function and includes an interface with the operator. The plant control network 11 includes a plurality of physical modules (sometimes referred to herein as nodes), which include a universal operator station (US) 122, an application module (AM) 124, a history module (HM) 126, a computer module (CM) 128, and duplicates (backup or secondary) of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 and HG 601 provide an interface between the LCN 120 and the UCN 14, and the LCN 120 and the data hiway 12, respectively.

Physical modules 122, 124, 126, 128, . . . of network 11 of the preferred embodiment are of various specialized functional types. Each physical module is the peer, or equivalent, of the other in terms of right of access to the network's communication medium, or LCN 120, for the purpose of transmitting data to other physical modules of network 11.

Universal operator station module (US) 122 of network 11 is a workstation for one or more plant operators. It includes an operator console, which is the interface between the plant operator or operators and the process or processes of the plant for which they are responsible. Each universal operator station module 122 is connected to the LCN 120, and all communications between the universal operator station module 122, and any other physical module of network 11, is via the LCN 120. Universal operator station module 122 has access to data that is on the LCN 120 and the resources and data available through, or from, any of the other physical modules of network 11. The universal station module 122 includes a cathode ray tube (CRT) display (not shown) which includes a video display generator, an operator keyboard (KB) (not shown), a printer (PRT) (not shown), and can also include (but not shown) a cartridge disk data storage device, trend pen recorders, and status displays, for example.

A history module (HM) 126 provides mass data storage capability. The history module 126 includes at least one conventional disk mass storage device such as a Winchester disk, which disk storage device provides a large volume of nonvolatile storage capability for binary data. The types of data stored by such a mass storage device are typically trend histories, event histories, . . . or data from which such histories can be determined, data that constitutes or forms CRT type displays, copies of programs for the physical modules.

An application module (AM) 124 provides additional data processing capability in support of the process control functions performed by the controllers associated with the process control subsystem 20, 20' such as data acquisition, alarming, batch history collection, and provide continuous control computational facilities when needed. The data processing capability of the application module 124 is provided by a processor (not shown) and a memory (not shown) associated with the module.

Computer module (CM) 128 uses the standard or common units of all physical modules to permit a medium-to-large scale, general-purpose data processing system to communicate with other physical modules of network 11 and the units of such modules over the LCN 120 and the units of process control subsystems 20, 20' via the hiway gateway module 601, and the NIM 602, respectively. Data processing systems of a computer module 128 are used to provide supervisory optimization, generalized user program preparation, and execution of such programs in higher-level program languages. Typically, the data processing systems of a computer module 128 have the capability of communicating with other such systems by a communication processor and communication lines.

The local control network 120 (LCN) is a high-speed, bit serial, dual redundant communication network that interconnects all the physical modules of plant control network 11. LCN 120 provides the only data transfer path between the principal sources of data, such as hiway gateway module 601, application module 124, and history module 126, and principal users of such data, such as universal operator station module 122, computer module 128, and application module 124. LCN 120 also provides the communication medium over which large blocks of data, such as memory images, can be moved from one physical module, such as history module 126 to universal station module 122. LCN 120 is dual redundant in that it consists of two coaxial cables that permit the serial transmission of binary signals over both cables.

Figure 2:
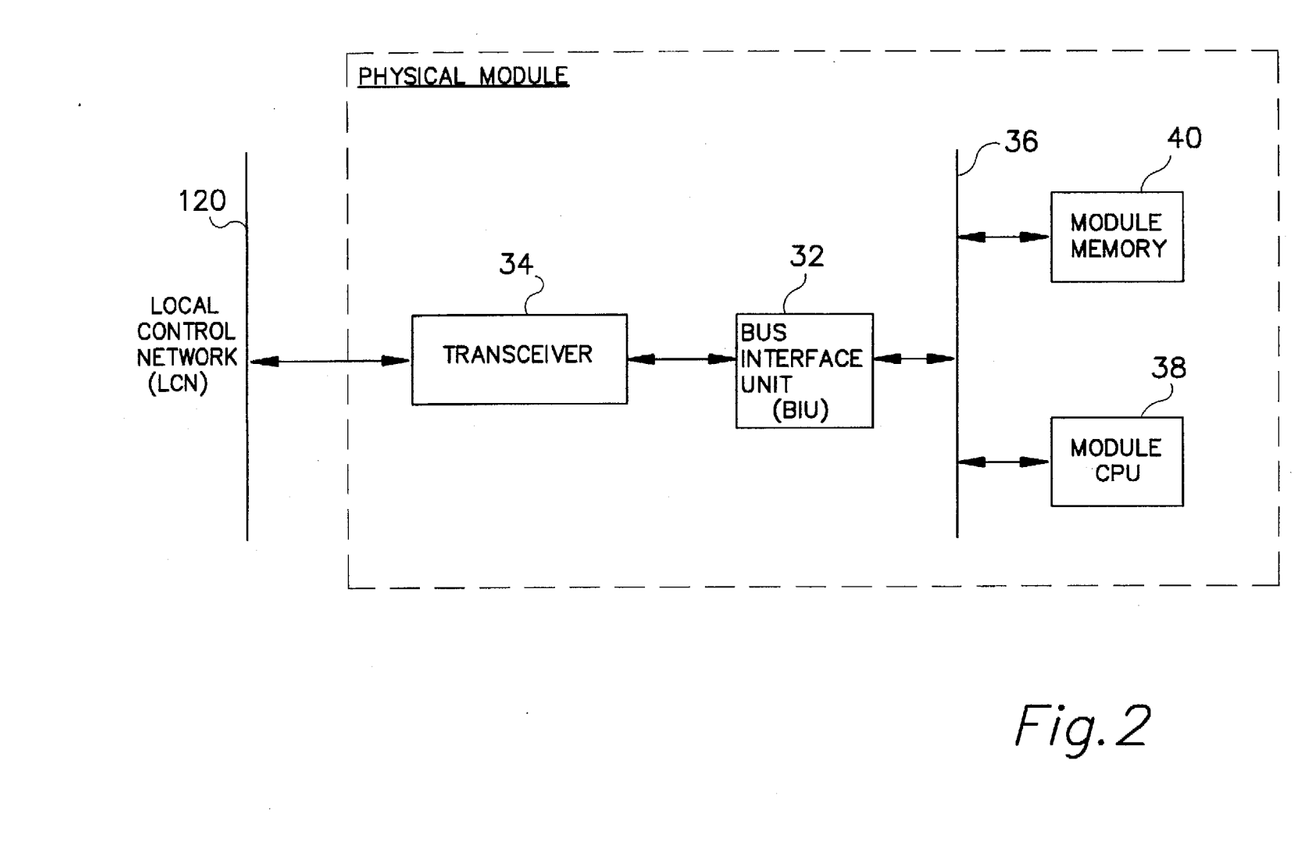
FIG. 2 shows a block diagram of common elements of each physical module of the process control system of FIG. 1.

Referring to FIG. 2, there is shown a block diagram of the common elements of each physical module of the network 11 or the process control system 10. Each of the physical modules includes a module central processor unit 38, a module memory 40, a random-access memory (not shown), and such additional controller devices or units (not shown) which are configured to provide the desired functionality of that type of module, i.e., that of the operator station 122, for example. The data-processing capabilities of each module's CPU 38 and module memory 40 create a distributed processing environment which provides for improved reliability and performance of network 11 and process control system 10. The reliability of network 11 and system 10 is improved because, if one physical module of network 11 fails, the other physical modules will remain operational. As a result, network 11 as a whole is not disabled by such an occurrence as would be the case in centralized systems. Performance is improved by this distributed environment in that throughput and fast operator response times result from the increased computer processing resources and the concurrency and parallelism of the data-processing capabilities of the system.

As mentioned above, each physical module includes the BUS interface unit (BIU) 32 which is connected to the LCN 120 by the transceiver 34. Each physical module is also provided with the module BUS 36 which, in the preferred embodiment, is capable of transmitting 16 bits of data in parallel, between the module CPU 38 and the module memory 40. Other units, utilized to tailor each type of physical module to satisfy its functional requirements, are operatively connected to module BUS 36 so that each such unit can communicate with the other units of the physical module via its module BUS 36. The BIU 32 of the physical module initiates the transmission of data over LCN 120. In the preferred embodiment, all transmissions by a BIU 32 are transmitted over the coaxial cables which, in the preferred embodiment, form the LCN 120.

Figure 3:
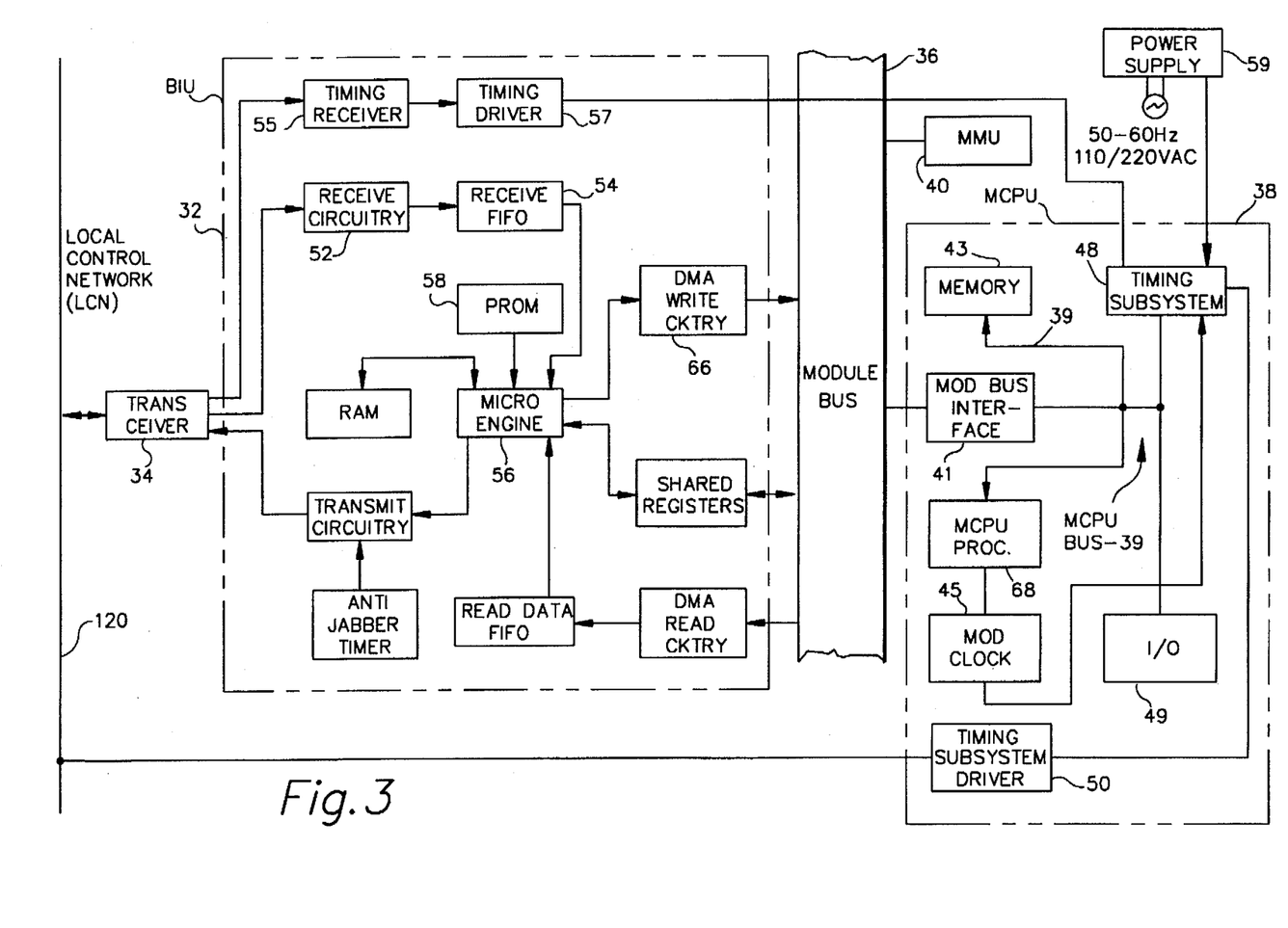
FIG. 3 shows a functional block diagram of a typical physical module of the process control system.

Referring to FIG. 3 there is shown a functional block diagram of a typical physical module 122, 124, 126, 128 of the plant control network 11, and includes the BUS interface unit (BIU) 32 and the transceiver 34, which connects BIU 32 to the LCN 120. BIU 32 is capable of transmitting binary data over LCN 120 and of receiving data from LCN 120. Transceiver 34 in the preferred embodiment, is transformer coupled to the LCN 120. In the preferred embodiment, the LCN 120 is a dually-redundant coaxial cable with the capability of transmitting bit serial data. BIU 32 is provided with a very fast micro engine 56. In the preferred embodiment, micro engine 56 is made up of bit slice components so that it can process eight bits in parallel and can execute a 24-bit microinstruction from its programmable read-only memory (PROM) 58.

Signals received from the LCN 120 are transmitted by transceiver 34 and receive circuitry 52 to receive FIFO register 54. Micro engine 56 examines the data stored in FIFO register 54 and determines if the information is addressed to the physical module. If the data is an information frame, the received data is transferred by direct memory access (DMA) write circuitry 66 by conventional direct memory access techniques to the physical module memory unit (MMU) 40 over module BUS 36.

Communication between MCPU processor 68, a Motorola 68020 microprocessor in the preferred embodiment, and other functional elements of MCPU 38 is via local microprocessor BUS 39. Module BUS interface element 41 provides the communication link between local BUS 39 and module BUS 36. Processor 68 executes instructions fetched from either its local memory 43, in the preferred embodiment an EPROM, or from MMU 40. Processor 68 has a crystal-controlled clock 45, which produces clock pulses or timing signals. Input/output (I/O) port 49 provides communication between MCPU 38 and equipment external to the physical module to permit program loading and the diagnosis of errors, or faults, for example.

Each MCPU 38 includes a timing subsystem 48 which, in response to clock signals from module clock 45, produces fine resolution, synchronization, and real-time timing signals. Any timing subsystem 48, which is provided with a timing subsystem driver 50, has the capability of transmitting timing information to other physical modules over the LCN 120. Another input to each timing subsystem 48 is timing information which is transmitted over LCN 120 and which is received through transceiver 34, timing receiver 55, and timing driver 57 of BIU 32. Timing pulses from module power supply 59, which are a function of the frequency of the external source of A.C. electric power applied to power supply 59, are used by timing subsystem 48 to correct longer-term frequency drift of the clock pulses produced by clock 45.

Additional information of the BIU 32 can be found in U.S. Pat. No. 4,556,974. A more detailed description of the process control system 10 can be had by referring to U.S. Pat. No. 4,607,256. Additional information regarding the individual, common, functional blocks of the physical modules can be had by reference to U.S. Pat. No. 4,709,347, all of the above-identified patents being assigned to the assignee of the present application; and additional information of the process controller 20' can be had by referencing U.S. Pat. No. 4,296,464.

The addition of an interface apparatus, which interfaces other systems to the process control system 10 described above and a modification to a graphics generator in the US 122, opens up the existing system, specifically the graphics interface, which includes designing in the capability to readily permit nodes of differing designs to communicate to the network, and will now be described.

Figure 4:
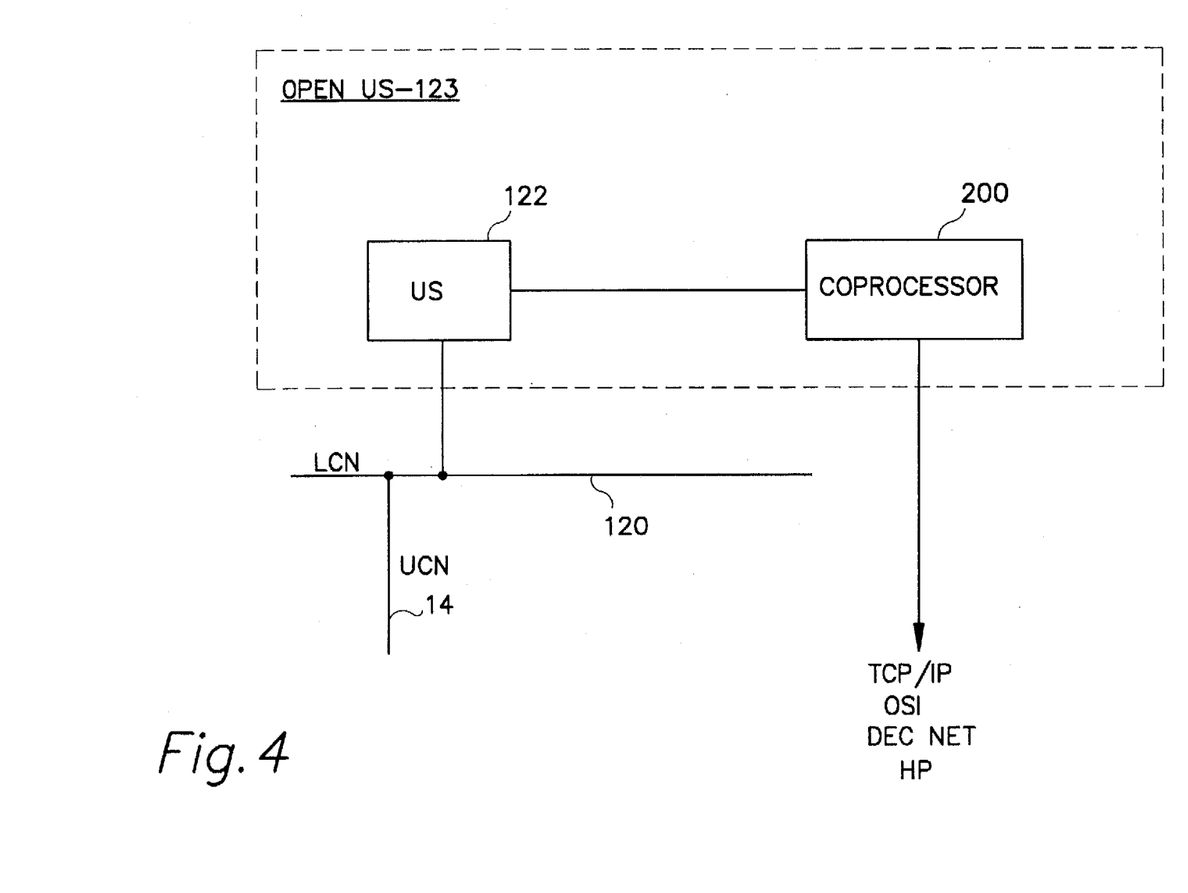
FIG. 4 shows a partial, functional block diagram of the existing system and the opened system of the preferred embodiment of the process control system.

Referring to FIG. 4, there is shown a partial functional block diagram of the existing system and the open (or opened) system. The universal operator station (US) 122 is coupled to a co-processor 200, and the co-processor is coupled to an open system, i.e., interfaces/protocols of differing design, including task control program/interface protocol (TCP/IP), open system interface (OSI), DECnet (a product of the Digital Equipment Corporation of Maynard, Mass.), ... The universal station 122 is also connected to the LCN 120 as described above. Thus, the new universal operator station (open US) 123 includes the US 122 as described above in conjunction with the co-processor 200. The purpose of the open US 123 is to open the graphical interface to the open systems and to provide information from the closed US to the open systems. The co-processor 200 is structured to permit the interface to other systems, i.e., the open systems without jeopardizing the integrity of the existing system. The co-processor 200 of the preferred embodiment is a Motorola 68040 microprocessor which is executing the UNIX operating systems (UNIX is an operating system of the American Telephone and Telegraph Company [AT&T], is readily available, and is well known to those skilled in the art), and is sometimes referred to as a UNIX co-processor.

Figure 5:
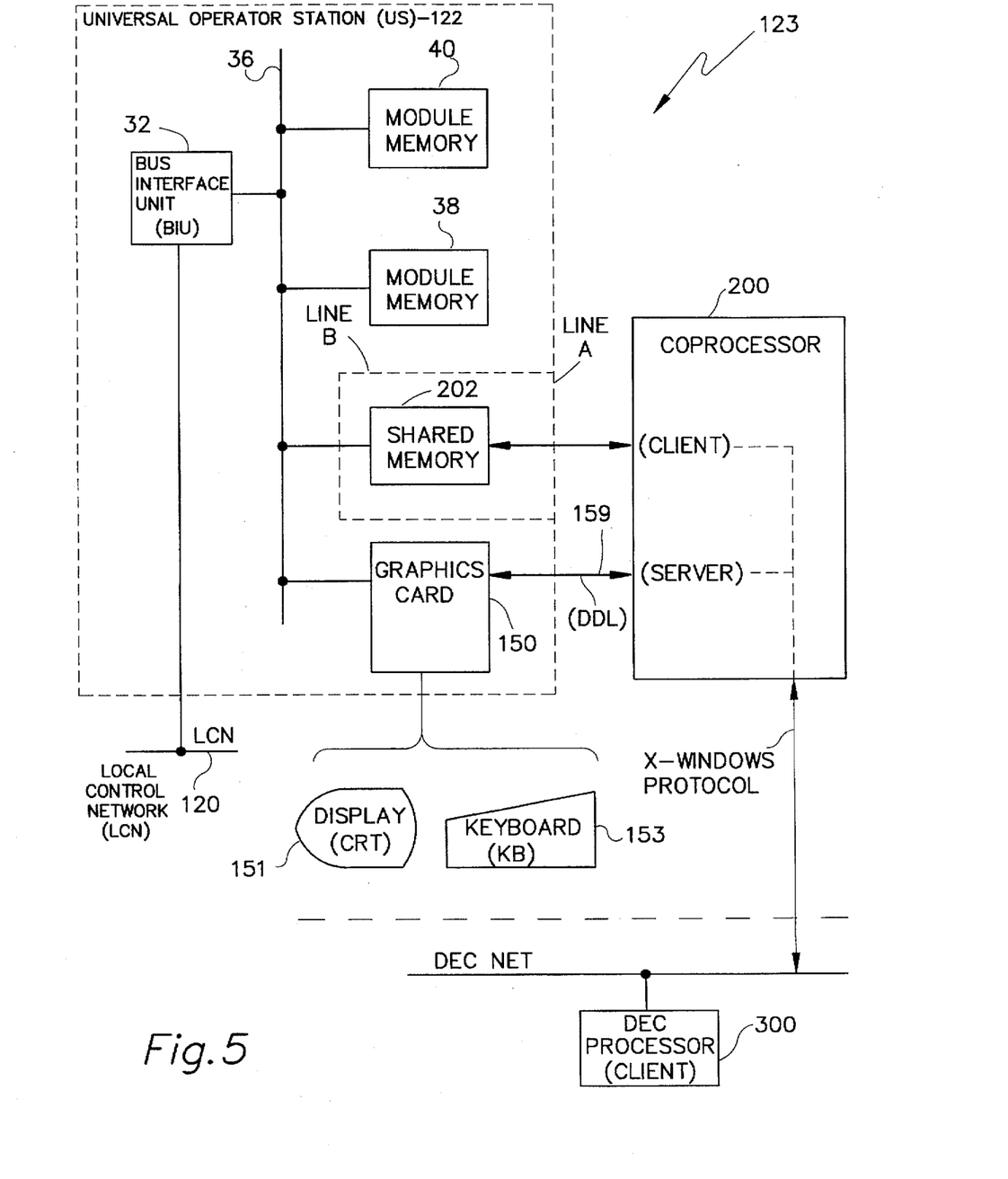
FIG. 5 shows a functional block diagram of an open operator station of the preferred embodiment of the process control system.

Referring to FIG. 5, there is shown a functional block diagram of the open operator station 123 of the preferred embodiment. The operator station 122 as described above includes the BIU 32 connected to the module BUS 36, the module memory 40, and the module CPU 38, both also connected to the module BUS 36. These basic functional blocks are contained in all the physical modules. Additional functional blocks added to the physical module is what gives the physical module its personality apart from any other physical module. The operator station 122 includes a graphics card 150 which interfaces with a display (CRT) and a keyboard (KB) 151,153. A shared memory 202 is included and is also connected to the module BUS 36 which provides for communication between the co-processor 200 and the US physical module 122 (thereby providing communication to the rest of the process control system 10 via the module CPU 38). Thus, the co-processor 200 requests service (e.g., the value of a point, contents of a file, ... or any information of the process control system 10) of the module CPU 38 through shared memory 202. The module CPU 38 then communicates with the appropriate module to perform the requested service in a normal fashion. Once the response is obtained the information is passed to the co-processor 200 via shared memory 202. Since the module CPU 38 is communicating via the LCN 120, the integrity of the LCN (i.e., the system) is maintained and similarly the module memory 40 cannot be corrupted by the co-processor 200.

Also shown in FIG. 5 is an example open system (or foreign system), for example, a Digital Equipment Corporation system which includes the DECnet network and protocol and a DEC processor 300 attached to the DECnet network. In the preferred embodiment, the communication between the DEC open system and the co-processor 200 is via an X-windows protocol (X-windows being a protocol defined by the Massachusetts Institute of Technology, Cambridge, Mass.) for graphical display information, and other open systems standards being used for data exchange. Any requests of the outside system to the LCN is made via the co-processor 200 through the shared memory 202 to the module CPU 38 as described above.

Figure 6:
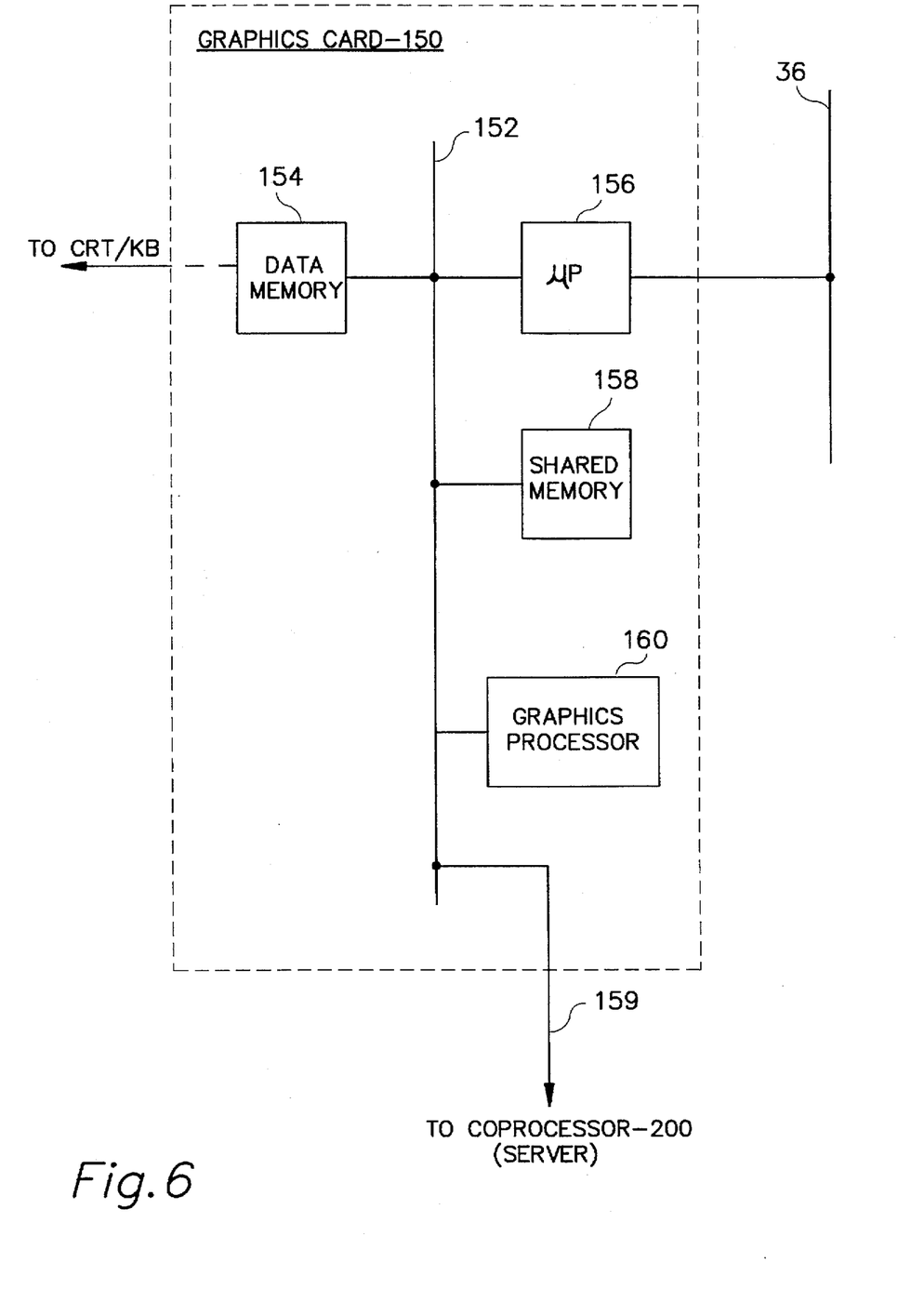
FIG. 6 shows a block diagram of a graphics card of the preferred embodiment of the universal station of the process control system.

It is also desired to open up the graphics interface such that a display which is not on the LCN can be displayed onto the CRT 151 of the US 122. This is achieved by the interface to the graphic card 150 from the co-processor 200. Referring to FIG. 6, there is shown a block diagram of the graphics card 150 of the preferred embodiment. The graphics card includes a card BUS 152. Attached to the card BUS 152 is a data memory 154 which contains the information which is to be displayed onto the CRT, and also contains some control information. A microprocessor 156 is also coupled to the card BUS 152 and further is coupled to the module BUS 36. A graphics processor 160 is coupled to the card BUS 152 and performs all the processing for developing the information stored in the data memory 154, including some control functions. A shared memory 158 is coupled to the card BUS 152. A connection is made from the card BUS 152 to the co-processor 200, thereby providing the interface mentioned above to the graphics card 150 from the co-processor 200. The microprocessor 156 of the preferred embodiment of the graphic card 15 is a Motorola 68020 processor. The graphics card 150 is a two-port graphics card, one port of the graphics card being tied to the module BUS 36, which is how a display is driven from LCN. The LCN 120 provides a "single window to the process," i.e., a screen display of what the process/process control system is doing. The second port is coupled to the co-processor 200 and provides the windows interface for the universal station 122. The windows interface is the X-windows interface which is well defined and well known to those skilled in the art (the interface being defined by MIT, Cambridge, Mass.). It is through the interface from the co-processor 200 that all the window displays (i.e., the screen display[s] of the open system[s]) and windows controls are performed, including commands to the graphic card 150 to specifiy where to place the single window to the process on the screen of the CRT 151. The interface between the graphics card 150 and the co-processor 200 is the full windows interface. One of the windows is the display referred to above as the "single window to the processor" (sometimes referred to as the LCN window). The co-processor 200 commands the graphics card 150 where the LCN window is to be placed on the CRT 151 and its relative size on the display. X-windows is a well defined protocol of how to communicate with the graphics card 150 (or any graphics card) and display and a computer, permitting many windows to be displayed. This includes displaying at least one window from the LCN and/or at least one window from the open system 300. In this system, a server is defined in X-windows as the machine that is driving the display (or that portion of the co-processor 200 which interfaces to the graphics card 150), and a client is the application program, in the present embodiment, the DEC processor 300.

Thus it can be seen that the process control system 10 is an open system permitting other foreign systems to interface into the LCN of the process control system and, because of the communication scheme described above, the integrity of the process control system 10 is maintained, further details of the communication between the process control system and the foreign system can be had by referring to U.S. Pat. No. 5,386,503, entitled "Method of controlling Window displays in an Open Systems Windows Environment," assigned to the same assignee as the present application.

Figure 7:
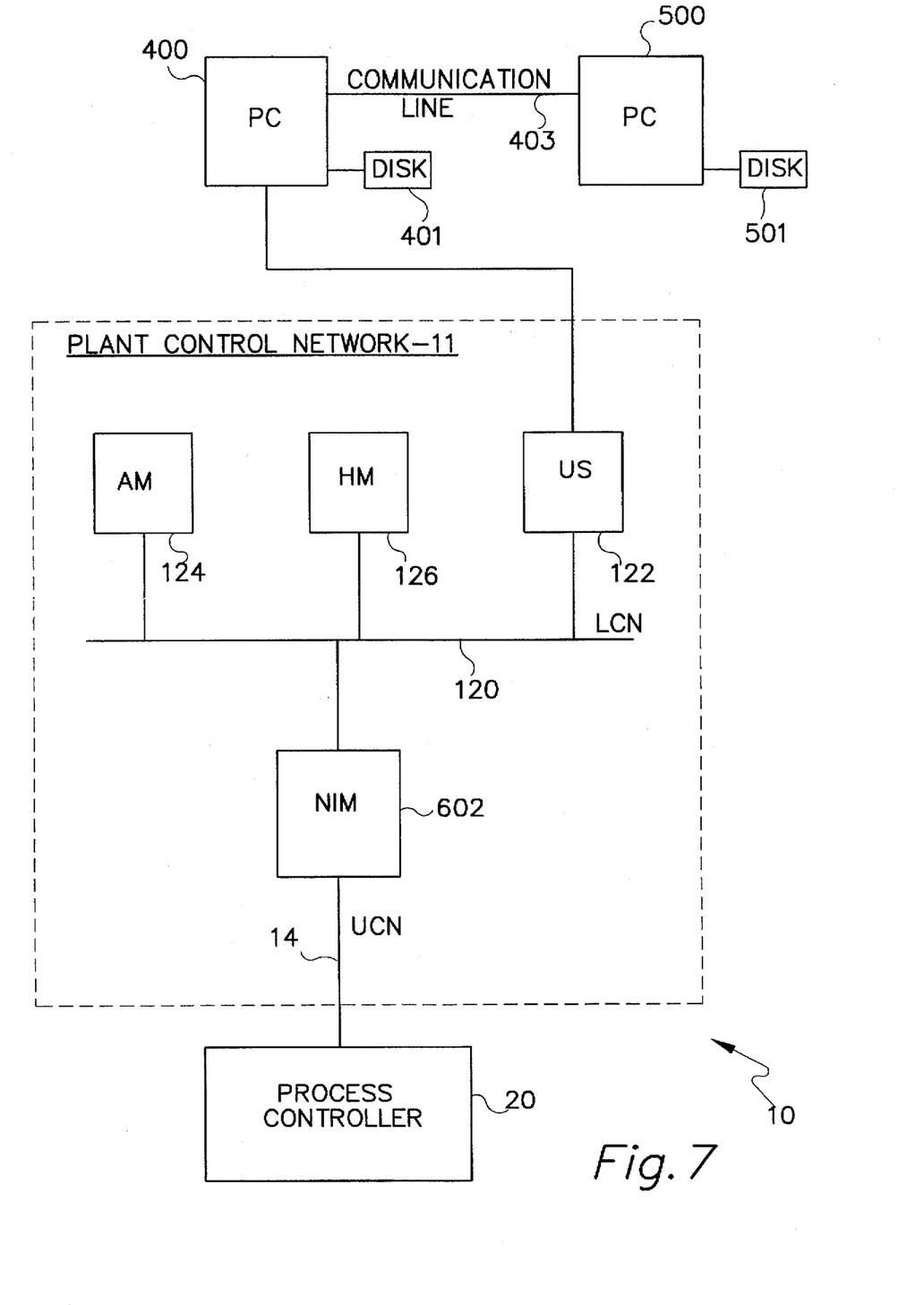
FIG. 7 shows a block diagram of the performance monitoring system of the preferred embodiment of the present invention coupled to the process control system of the preferred embodiment.

Referring to FIG. 7, in which a block diagram of the present invention is shown, the present invention will now be described. A process control system 10, which can be a closed system or an open system as described above, is shown. a computer system 400 (which in the preferred embodiment is a personal computer, PC), having a disk 401 and a monitor (not shown) and a keyboard (not shown), is operatively connected to the plant control network 11. In the preferred embodiment the connection of the PC is made to the US 122 and, in particular, to the module BUS 36 of the US 122, via an existing serial port of the US. (It should be noted that the connection can be made to any existing node of the LCN 120.) The PC 400 is located in proximity with the plant control network 11. The PC 400 is coupled to a communication line 403 and thereby to a second computer system (or remote computer system) 500. The second computer system 500 is, in the preferred embodiment, a personal computer system (PC) 500 remotely located from the plant control network 11. The remote PC 500 also includes a disk 501, a monitor (not shown), and a keyboard (not shown). It will be recognized that the communication line 403 can be telephone lines, analog lines, digital lines, . . . or any type of communication between the two points, i.e., the local PC 400 and the remote PC 500.

Software running in the local PC accesses the LCN 120 on a predetermined basis for obtaining predetermined data. The frequency of the request is such that there is essentially no performance impact on the process control system 10. The access is performed in accordance with the LCN protocol, thereby maintaining the integrity of the process control system 10. The software of the local PC 400 does several functions, including:

- collecting predetermined control node system performance parameters on a continuous, periodic, and non-intrusive basis and historizing the values. An example of a parameter is the current central processing unit (CPU) loading of each node in the process control system 10;
- analyzing the performance data in real time as it is collected an comparing the most recent values with a user changeable alarm limit or threshold. If a limit is exceeded, the local PC 400 calls the remote PC 500 via the modems and communication line 403 and sends an alarm message to the remote PC 500 and optionally also sends a message to a remote paging device (not shown).
- the remote PC 500 can at any time call up the local PC 400 and download the historized performance parameters or perform other maintenance functions on the local PC 400.

Figure 8A:
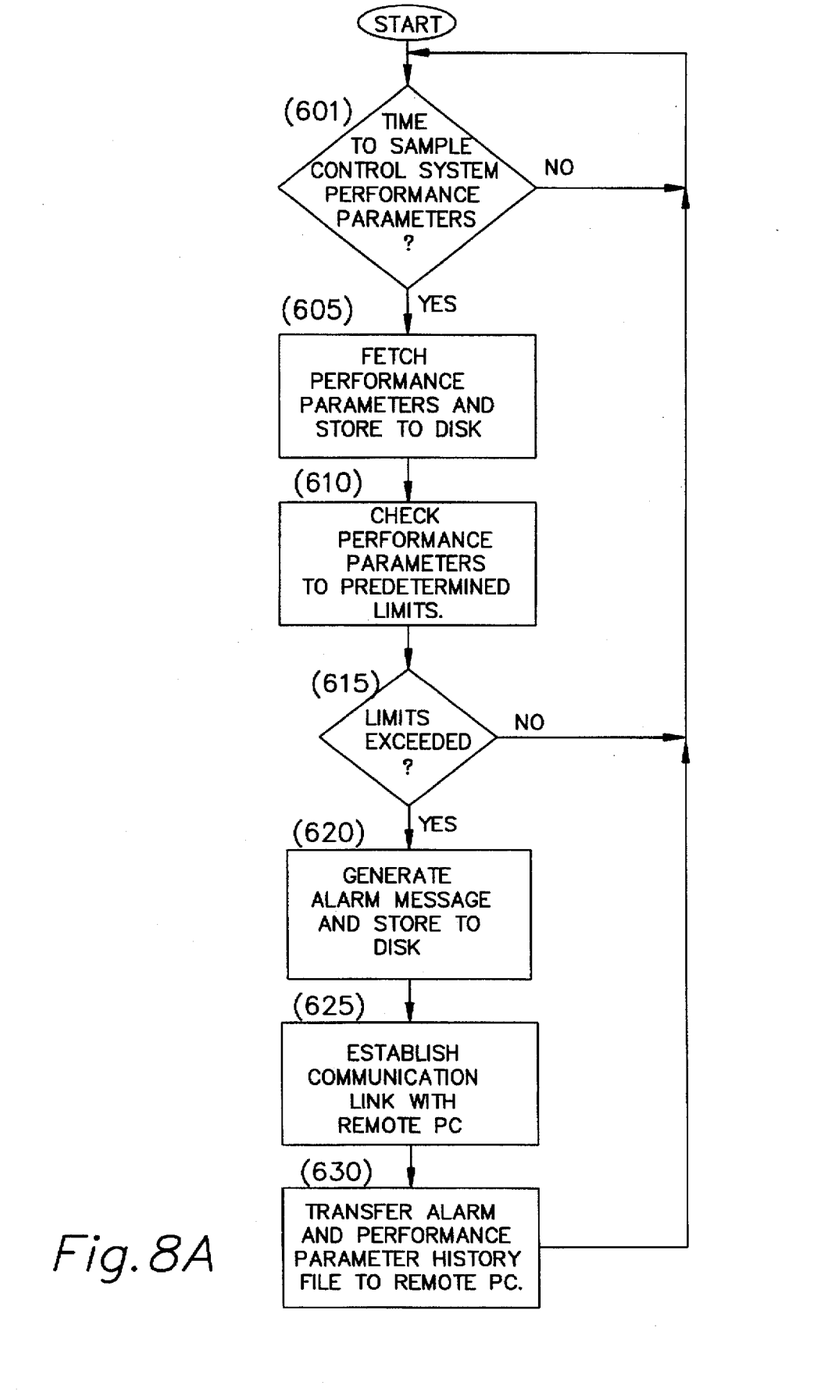
FIGS. 8A and 8B show a flow digram of the functions performed by a local personal computer software and a remote personal computer software, respectively.
Figure 8B:
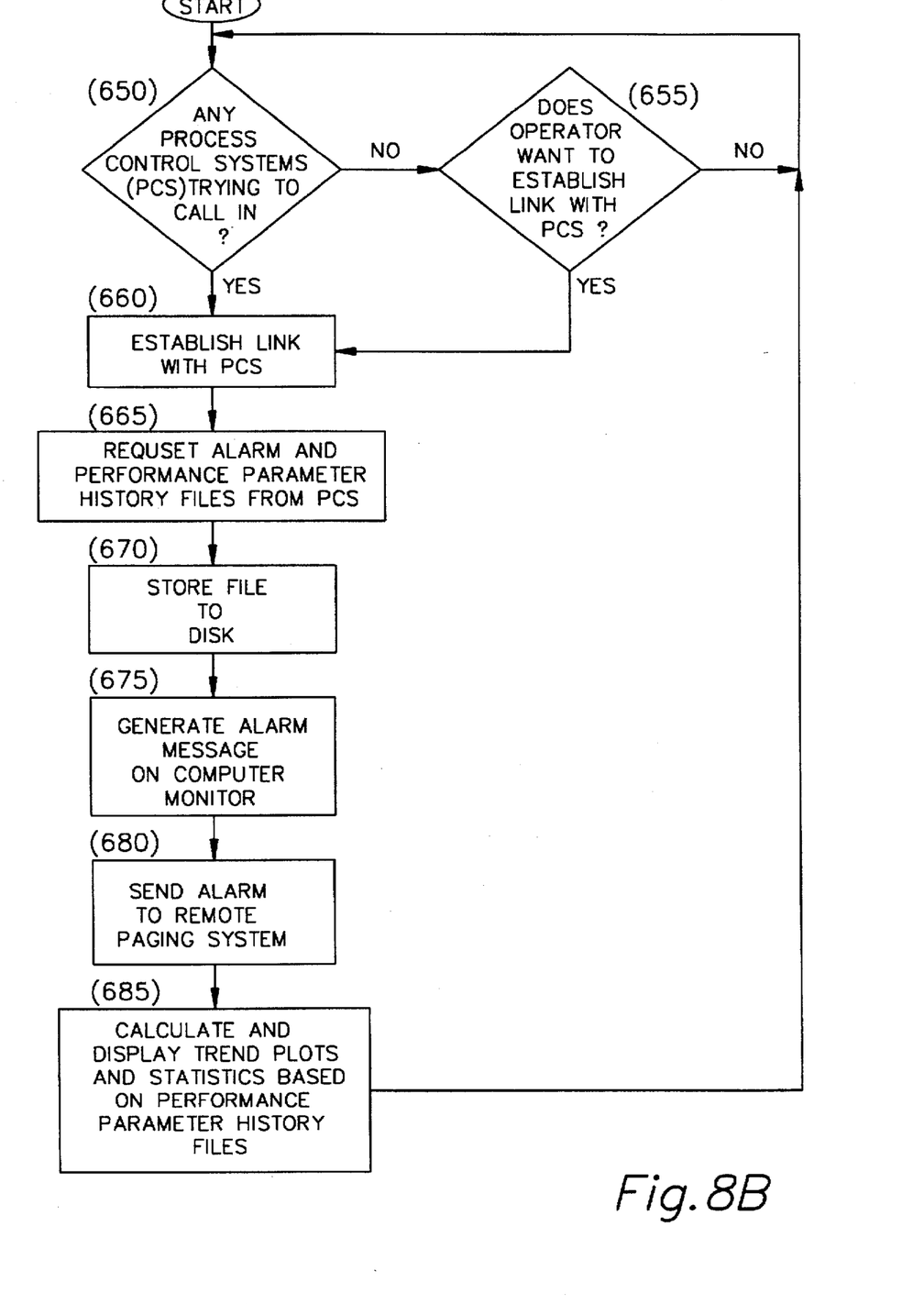

Referring to FIGS. 8A and 8B, there is shown a flow diagram of the functions performed by the local PC 400 software and the remote PC 500 software, respectively. The local PC 400 is waiting until it is time to sample predetermined process control system (PCS) performance parameters (block 601). If the time is such that the sampling of the performance parameters is to be performed, the local PC 400 accesses the LCN 120 and any of the respective nodes (or physical modules) attached to the LCN in accordance with the LCN protocol to obtain the performance parameters (block 605) and stores them onto he disk 401. The performance parameters are then checked against predetermined limits, which can be predetermined or entered by the user, i.e., the user of the process control system 10 (block 610). If the limits have not been exceeded, the software returns to block 601 and waits for the next time the performance parameters must be accessed (block 615). If a limit has been exceeded (block 615), an alarm message is generated and stored to the disk 401 (block 620). A communication link is then established with the remote PC 500 via the communication line 403 (block 625), and the alarm and performance parameter history file is transferred to the remote PC 500.

Referring to FIG. 8B, the software of the remote PC 500 determines if any PCS 10 are trying to call in (block 650). If not, the remote PC 500 determines if an operator at the remote location is trying to establish a communication link with the PCS 10 (block 655). If not, the soft-ware goes back to the wait mode (block 650). If a PCS is trying to call in (block 650) or if an operator is trying to establish a communication link with the PCS 10 (block 655), the remote PC 500 establishes the communication link with the PCS 10 (block 660) and requests the alarm and performance parameter history files from the PCS 10 (block 6650. The information received by the remote PC 500 is stored on the disk 501 (block 670) and an alarm message is generated on the PC 500 monitor (not shown) (block 675). Optionally, the alarm can be sent to a remote paging system (block 680) and can calculate and display trend plots and statistics based on performance parameter history files (block 685). The remote PC then returns to waiting and attempts to call in by the PCS 10 (block 650).

Once the alarm indication is received at the remote PC location, an operator there can initiate any corrective action in accordance with a predetermined procedure. Although the software s described above indicates two optional functions, it will be understood by those skilled in the art that a plurality of functions can be initiated by the remote PC 500 and/or by the operator located at the remote location.

While there has been shown what is considered the preferred embodiment of the present invention, it will be manifest that many changes and modifications can be made therein without departing from the essential scope and spirit of the invention. It is intended, therefore, in the annexed claims to cover all such changes and modifications that fall within the true scope of the invention.

What is claimed is:

1. In a process control system (PCS), having a control network and a plurality of nodes coupled to the control network, the PCS controlling a process, a monitoring system operatively connected to said PCS for obtaining predetermined data of the PCS to monitor the performance of the PCS, the monitoring system comprising:
   a) a first computer system operatively connected to the control network located in physical proximity to the PCS, for obtaining the predetermined data of the PCS on a periodic basis in accordance with a predetermined protocol of the control network, the first computer system arranged to assess the predetermined data obtained from the PCS and to generate an alarm when an alarm condition of the PCS is indicated;
   b) a second computer system, located remotely from the PCS, for receiving the predetermined data, the predetermined data of the PCS being transferred from the first computer system to the second computer system, the transfer being initiated by the first computer system when an alarm condition of the PCS is indicated by the predetermined data; and
   c) a communication line, operatively connected to the first and second computer systems, for providing a communication link between said first and second computer systems.

2. A monitoring system according to claim 1, wherein said first computer system is a personal computer.

3. A monitoring system according to claim 1, wherein said second computer system is a personal computer.

4. A monitoring system according to claim 1, wherein said first computer system further includes predetermined data limits stored in said first computer, and said first computer continually compares the predetermined data obtained from the PCS to the predetermined data limits stored in said first computer, generating an alarm message when an alarm condition in the PCS exists whereby said alarm message is transferred from said first computer to said second computer along with said predetermined data.

5. A monitoring system according to claim 4, wherein said personal computer further comprises a disk, a monitor, and a keyboard.

6. A monitoring system according to claim 2, wherein said personal computer further comprises a disk, a monitor, and a keyboard.

7. A monitoring system according to claim 3, wherein said personal computer further comprises a disk, a monitor, and a keyboard.

8. A monitoring system according to claim 5, wherein said predetermined data comprises predetermined PCS performance data.

9. A monitoring system according to claim 1, wherein said predetermined data obtained from the PCS is transferred from said first computer system to said second computer system, initiated on command of an operator of said second computer system.

10. In a process control system (PCS), having a control network and a plurality of nodes coupled to the control network, the PCS controlling a process, a monitoring system including a first computer system operatively connected to the PCS, a second computer system remotely located to said first computer system, and a communication line operatively connecting the first computer system to the second computer system, a method for monitoring the performance of the PCS, including the steps of:
   a) obtaining performance data from the PCS on a periodic basis in accordance with a predetermined protocol of the control network;
   b) assessing the performance data obtained from the PCS;
   c) generating an alarm message when an alarm condition of the PCS is indicated;
   d) establishing communication link to the second computer system via the communications line when an alarm condition of the PCS is indicated; and
   e) transferring the performance data from the PCS and the alarm message to the second computer system over the communication link.

11. The method according to claim 10, wherein the first computer system includes predetermined performance data limits stored in the first computer system and the step of assessing the performance data obtained from the PCS includes comparing the performance data obtained from the PCS to the performance data limits stored in the first computer system.

12. The method according to claim 11, wherein the second computer system is manually operable and a communication link between the first computer system and the second computer system is initiated on command of an operator of the second computer system whereby the performance data from PCS and the alarm message are transferred to the second computer system over said communication link.

13. The method according to claim 12, wherein the second computer system includes a display device and the method for monitoring the performance of the PCS further includes the steps of:
   a) generating an alarm indication suitable for presentation on the display device responsive to receiving the alarm message; and
   b) generating trends, plots, and graphs suitable for presentation on the display device responsive to receiving the performance data from the PCS.

14. In a process control system (PCS), having a control network and a plurality of nodes coupled to the control network, the PCS controlling a process, a monitoring system including a first computer system operatively connected to the PCS, a second computer system remotely located to the first computer system and a communication line operatively connecting the first computer system to the second computer system, a method for monitoring the performance of the PCS, including the steps of:
   a) obtaining performance data from the PCS on a periodic basis in accordance with a predetermined protocol of the control network;
   b) assessing the performance data obtained from the PCS;
   c) establishing a communication link to the second computer system via the communications line when a predetermined condition of the PCS is indicated; and,
   d) transferring the performance data from the PCS to the second computer system over the communication link.

* * * * *